United States Patent [19]
Kawai

[11] Patent Number: 5,969,001
[45] Date of Patent: *Oct. 19, 1999

[54] FRICTION MATERIAL FOR A SYNCHRONIZER RING

[75] Inventor: Satoshi Kawai, Hokkaido, Japan

[73] Assignee: Dynax Corporation, Hokkaido, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/711,136

[22] Filed: Sep. 9, 1996

[30] Foreign Application Priority Data

Feb. 16, 1996 [JP] Japan .................................. 6-052664

[51] Int. Cl.⁶ ........................................................ C08J 5/14
[52] U.S. Cl. ............................ 523/158; 523/149; 524/15; 524/423; 524/437; 524/440; 524/493; 524/494; 524/495; 524/593; 524/594; 192/107 M
[58] Field of Search ..................................... 523/149, 158; 524/413, 423, 437, 440, 493, 494, 495, 593, 594, 15; 192/107 M

[56] References Cited

U.S. PATENT DOCUMENTS

| | | | |
|---|---|---|---|
| 4,267,912 | 5/1981 | Bauer et al. | 192/53 F |
| 4,324,706 | 4/1982 | Tabe et al. | 523/149 |
| 4,678,818 | 7/1987 | Nakagawa et al. | 523/157 |
| 5,038,628 | 8/1991 | Kayama | 74/339 |

OTHER PUBLICATIONS

Kirk Othmer, Encyclopedia of Chemical Technology, vol. 4, pp. 988–989.

*Primary Examiner*—Marion McCamish
*Assistant Examiner*—John J. Guarriello
*Attorney, Agent, or Firm*—Quarles & Brady

[57] ABSTRACT

A friction material for a synchronizer ring which exhibits good heat resistance, wear resistance and scorching resistance properties has 30 to 70% by weight of a carbon material, 10 to 40% by weight of a thermosetting resin, 5 to 30% by weight of metal fibers or metal particles and 5 to 40% by weight of inorganic fibers or inorganic particles, and having a porosity of 10 to 50%. The carbon is porous graphite particles of a size distribution in which not less than 50% of the entire number of said graphite particles have a particle diameter from 44 to 250 $\mu$m. The thermosetting resin is a novolac type phenol resin, epoxy modified phenol resin, melamine modified phenol resin, cashew modified phenol resin, hydrocarbon resin modified phenol resin or cresol modified phenol resin. The metal fibers or metal particles are an alloy containing aluminum, copper, iron, nickel, zinc or lead as the main ingredient, the inorganic fibers or particles are barium sulfate, wollastonite, silicon, potassium titanate, glass or alumina and organic fibers and cashew dust are each contained in an amount of not more than 10% by weight.

12 Claims, 1 Drawing Sheet

FRICTION MATERIAL FOR A SYNCHRONIZER RING

BACKGROUND OF THE INVENTION

1. Field of the Invention

The present invention relates to friction material used for a synchronizer ring in a speed change gear, for example in a syncromesh transmission.

2. Discussion of the Prior Art

A synchronizer ring is a ring-shaped member assembled, for example, in a speed change gear of an automobile for synchronously rotating two gears which are changed and meshed upon gear changing operation of the speed change gear such that the two gears engage smoothly with each other.

The synchronizer ring has a friction material layer secured to a ring-shaped structural body. The friction material layer is disposed to the inner circumference of the structural body, to the outer circumference of the structural body or on both sides of the inner circumference and outer circumference of the structural body. In each case, the friction material layer is frictionally engaged to a tapered portion (cone portion) of the speed change gear.

As a friction material for the friction material layer, copper alloys, for example, MBA-2 and MBA-5 are often used. Further, a paper material is also used although not frequently. In addition, molybdenum is sometimes secured by flame spraying to the structural body.

The following characteristics are required for the synchronizer ring:

(1) Having a large dynamic friction coefficient to a mating member for synchronizing two gears by frictionally engaging a tapered portion as the mating member.

(2) Having a low friction coefficient at a relative speed nearly equal zero (hereinafter referred to as "static friction coefficient") in order to decrease impact shocks upon engaging a mating gear.

(3) Being resistant to scorch as a result of braking frictional heat when braking is applied to a mating member, and particularly being resistant to scorch from braking frictional heat generated upon misoperation of a shift lever.

The misoperation of the shift lever referred to above occurs when the shift lever is displaced without properly pedaling the clutch pedal. Upon this misoperation, since the engine torque is transmitted to one gear and the other gear is rotated at a torque greater than the torque of idling when the clutch is completely disengaged, a large thermal load (reaching ten and several times as much as the usual load) is applied to the synchronizer ring. As a result, the temperature of the friction material is elevated by braking frictional heat, possibly causing carbonization or abnormal wear to deteriorate the synchronizing function.

Copper alloys are often used as the friction material since precedence tends to be given to the characteristic (3) among the three characteristics described above. However, since copper alloys have a relatively low dynamic friction coefficient, the characteristics (1) and (2) which copper alloys exhibit are poor.

In view of this, the friction surface of the copper alloy has been made as dual or triple composite layers, thereby increasing the capacity for absorbing the braking frictional heat and increasing the dynamic friction coefficient, to improve characteristic (1). However, if the friction surface is made in composite layers, it results in the problem of the mechanism of the speed change gear being complicated, enlarged in scale and expensive.

On the other hand, although a paper material has characteristics (1) and (2), it is susceptible to scorch by braking frictional heat upon misoperation of the shift lever. Further, although molybdenum exhibits good dissipation of braking frictional heat upon misoperation of the shift lever, it performs relatively poorly respecting characteristics (1) and (2).

In addition, to provide the synchronizer ring with a satisfactory friction characteristic, it is necessary to form a number of fine holes to the friction material. If a number of fine holes are formed in the friction material, when the synchronizer ring is brought into contact with a mating member, the formation of oil membranes at the friction interface is reduced, thereby increasing the dynamic friction coefficient. Thus, the friction material used in a synchronizer ring should have good heat resistance, wear resistance, scorching resistance and porosity, together.

SUMMARY OF THE INVENTION

In the present invention, the foregoing subjects have been solved by a friction material for a synchronizer ring, comprising 30 to 70% by weight of a carbon material, 10 to 40% by weight of a thermosetting resin, 5 to 30% by weight of metal fibers or metal particles and 5 to 40% by weight of inorganic fibers or inorganic particles, and having a porosity of 10 to 50%. As used herein, "pores" means apertures open to the surface, while "porosity" means a ratio of the area of pores formed in the friction material relative to the area of the friction material.

The carbon material is excellent in heat resistance and improves the heat resistance of the friction material. Accordingly, the synchronizer ring can ensure, for example, a good resistance to braking frictional heat upon misoperation of the shift lever to reduce scorching of the mating member. If the carbon material is less than 30% by weight, the heat resistance of the friction material is lowered, whereas if it exceeds 70% by weight, the rigidity of the friction material is lowered.

The thermosetting resin functions as a binder for each of the ingredients in the friction material and improves the rigidity of the friction material. If the heat setting resin is less than 10% by weight, the rigidity of the friction material is lowered. If it exceeds 40% by weight, a desired porosity can not be obtained and the dynamic friction coefficient of the friction material can not be increased.

The metal fibers or metal particles help prevent reduction of the dynamic friction coefficient of the friction material by the braking frictional heat. If the metal fibers or metal particles are less than 5% by weight, the dynamic friction coefficient of the friction material is lowered. If they exceed 40% by weight, the synchronizer ring may stick to the mating member.

The inorganic fibers or inorganic particles reinforce the thermosetting resin as a binder to obtain a desired porosity. If the inorganic fibers or inorganic particles are less than 5% by weight, the inorganic fibers or particles can not reinforce the thermosetting resin. If they exceed 40% by weight, the flexibility of the friction material is deteriorated, and the friction material layer results in abrasion wear of the mating member.

If the porosity of the friction material is from 10 to 50%, formation of oil membranes at the friction boundary between the synchronizer ring and the mating member is reduced, thereby obtaining a friction material of a large dynamic friction coefficient.

DETAILED DESCRIPTION OF THE PREFERRED EMBODIMENTS

Figure 1:
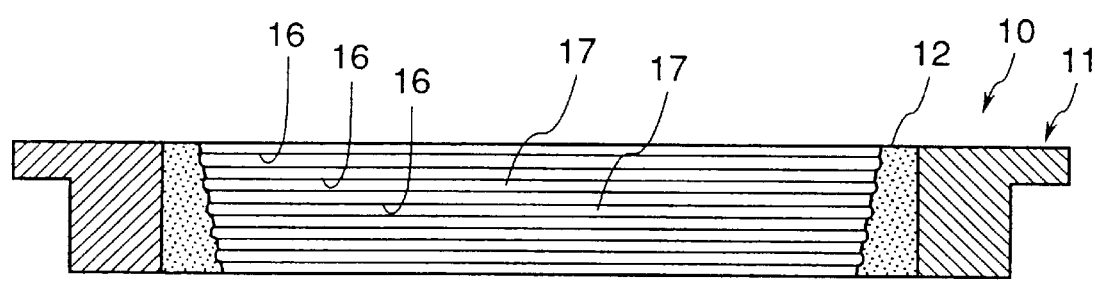
FIG. 1 is a diametric cross sectional view of a synchronizer ring having a friction material layer according to the present invention.

The present invention is explained by way of its embodiments with reference to Table 1, Table 2 and FIG. 1.

A synchronizer ring 10 shown in FIG. 1 has a friction material layer 12 made of a friction material on the inner circumference of a ring-shaped structural body 11.

Any of a number of manufacturing methods may be used to make a synchronizer ring of the invention. In one, a material for a structural body and a friction material are placed in a molding die and heated to 180 to 300° C. to integrate and mold the structural body and the friction material layer. Subsequently, the integrated structural body and friction material layer are kept for 20 to 30 min. at 230 to 500° C. Finally, the inner circumference of the friction material layer is cut into a tapered shape (conical shape), and grooves 16 are formed to the inner circumference thereof. Top lands 17 are defined in the friction material layer 12 by the grooves 16.

In another method, material for a structural body and a friction material are placed in a molding die and heated to 200 to 350° C. by supplying electric current to integrate and mold the structural body and the friction material layer. Finally grooves 16 are formed.

In another method, material for a structural body and a friction material are filled in a molding die and heated by plasma discharge to 1200° C., and then the structural body and the friction material layer are molded integrally in a reducing atmosphere or a reduced pressure atmosphere. Finally, grooves 16 are formed.

Alternatively, a small amount of binder may be added to a friction material, the friction material shaped into a sheetlike form by roll pressing, pressurization by pressing machine or by the same manufacturing method as that for paper making, punched out into the desired shape and then integrated with a structural body. Another variation is that a friction material previously molded into a ring-shape may be integrated with a structural body. In sum, any suitable manufacturing method may be used to make a synchronizing ring incorporating the invention.

The structural body 11 is preferably made of brass. The friction material of the friction material layer 12 comprises a composition of a carbon material, a thermosetting resin, metal fibers, inorganic fibers, etc.

Table 1 is an ingredient table for samples of 20 types of friction material, nos. 1–10 of which incorporate the invention.

TABLE 1

| Sample (No.) | | Formulation ingredient (wt %) | | | | | | |
|---|---|---|---|---|---|---|---|---|
| | | Carbon | Thermo-setting resin | Metal fiber or metal particle | Inorganic fiber or inorganic particle | Organic fiber | Cashew dust | Porosity (%) |
| Friction material of the invention | 1 | 55 | 20 | 10 | 15 | — | — | 25 |
| | 2 | 65 | 15 | 10 | 10 | — | — | 25 |
| | 3 | 40 | 35 | 10 | 15 | — | — | 25 |
| | 4 | 40 | 15 | 10 | 35 | — | — | 25 |
| | 5 | 40 | 15 | 25 | 20 | — | — | 25 |
| | 6 | 55 | 20 | 10 | 15 | — | — | 15 |
| | 7 | 55 | 20 | 10 | 15 | — | — | 35 |
| | 8 | 55 | 20 | 10 | 10 | 5 | — | 40 |
| | 9 | 50 | 20 | 10 | 15 | — | 5 | 25 |
| | 10 | 50 | 15 | 10 | 15 | 2 | 8 | 30 |
| Comparative Example | 11 | 20 | 50 | 10 | 20 | — | — | 15 |
| | 12 | 80 | 10 | — | 10 | — | — | 20 |
| | 13 | 10 | 20 | 50 | 30 | — | — | 15 |
| | 14 | 20 | 30 | — | 50 | — | — | 15 |
| | 15 | 50 | 20 | — | 10 | — | 20 | 15 |
| | 16 | 55 | 20 | 10 | 15 | — | — | 5 |
| Existent Example | 17 | Brass | | | | | | — |
| | 18 | Paper | type | friction | material | | | 35 |
| | 19 | Mo | sprayed | to | structural | body | | 5 |
| | 20 | Resin | type | friction | material | | | — |

Table 2 is a table showing the results of conducting various kinds of tests using each of the samples of the 20 types shown in Table 1 as the friction material layer 12.

TABLE 2

| | | Friction wear test for individual unit | | | Abrasion | | | |
|---|---|---|---|---|---|---|---|---|
| | | Dynamic friction coefficient | | Static friction coefficient | | wear amount of | Damage to | | |
| Sample (No.) | | 200 cycles | 10000 cycles | 200 cycles | 10000 cycles | friction material | mating member | Severe condition test | Compression wear test |
| Friction | 1 | 0.108 | 0.098 | 0.081 | 0.097 | 0.35 | Clouded | 20 cycles OK | 1500 |
| material | 2 | 0.105 | 0.091 | 0.077 | 0.088 | 0.40 | Clouded | 20 cycles OK | 1250 |
| of the | 3 | 0.112 | 0.095 | 0.091 | 0.103 | 0.30 | Sliding trace | 20 cycles OK | 1500 |
| invention | 4 | 0.102 | 0.093 | 0.075 | 0.083 | 0.20 | Clouded | 20 cycles OK | 1750 |
| | 5 | 0.105 | 0.095 | 0.080 | 0.088 | 0.25 | Sliding trace | 20 cycles OK | 1500 |
| | 6 | 0.106 | 0.088 | 0.083 | 0.095 | 0.20 | Clouded | 20 cyctes OK | 1750 |
| | 7 | 0.114 | 0.105 | 0.075 | 0.082 | 0.45 | Clouded | 20 cycles OK | 1750 |
| | 8 | 0.125 | 0.110 | 0.072 | 0.080 | 0.35 | Clouded | 20 cycles OK | 1000 |
| | 9 | 0.120 | 0.099 | 0.088 | 0.100 | 0.40 | Clouded | 20 cycles OK | 1250 |
| | 10 | 0.118 | 0.104 | 0.090 | 0.103 | 0.35 | Clouded | 20 cycles OK | 1000 |
| Comparative | 11 | 0.081 | 0.091 | 0.070 | 0.113 | 0.30 | Blackened | 15 cycles scorched | 2000 |
| Example | 12 | 0.112 | 0.084 | 0.085 | 0.094 | 0.70 | Clouded | 9 cycles abraded | 500 |
| | 13 | 0.080 | 0.086 | 0.075 | 0.098 | 0.25 | Stepped wear | 20 cycles OK | 2000 |
| | 14 | 0.102 | 0.092 | 0.088 | 0.100 | 0.40 | Stepped wear | 20 cycles OK | 1750 |
| | 15 | 0.116 | 0.100 | 0.095 | 0.113 | 0.60 | Clouded | 13 cycles scorched | 500 |
| | 16 | 0.085 | 0.080 | 0.073 | 0.099 | 0.50 | Clouded | 20 cycles OK | 1750 |
| Existent Example | 17 | 0.075 | 0.128 | 0.061 | 0.094 | 0.40 | Stepped wear | 5 cycles back abutment | — |
| | 18 | 0.136 | 0.123 | 0.113 | 0.104 | 0.25 | Clouded | 2 cycles scorched | 250 |
| | 19 | 0.081 | 0.109 | 0.016 | 0.111 | 0.45 | Stepped wear | 15 cycles abraded | 2000 |
| | 20 | 0.088 | 0.113 | 0.075 | 0.121 | 0.55 | Btackened | 20 cycles OK | 500 |

In Table 2, the friction wear test for an individual unit is a test of pressing the synchronizer ring 11 at a force of 70 Kgf to a tapered mating member made of a material SCM 420 and rotated in gear oil at 80° C., under an amount of inertia of 0.010 Kgf m/(sec$^2$), at the speed of 1,600 rpm, thereby stopping the mating member, repeating such procedure for ten thousand cycles and examining the dynamic friction coefficient and the static friction coefficient for each of the samples at 200 cycles and at ten thousand cycles.

The column for the amount of wear of the friction material shows the value for the axial length of wear of the friction material layer measured on each sample in the friction wear test for an individual unit. The column for the damage of the mating member shows the result of examination on each sample for the degree of damage that the surface of the polished mating member suffered by the friction material layer in the friction wear test for an individual unit.

In the column for the damage of the mating member, "clouded" indicates that the polished mating member is abraded to such an extent as to cause clouding. "Sliding trace" indicates that the mating member is abraded to such an extent as trace is left on the surface. "Blackened" indicates that the mating member is scorched with the friction material layer and discolored black. "Stepped wear" indicates that the mating member is abraded to such an extent as to cause a step on the surface.

In Table 2, a severe condition test is a test of pressing the synchronizer ring for 2 seconds at a force of 100 Kgf to a tapered mating member made of a material of SCM 420 rotating at the speed of rotation of 1,600 rpm and then keeping it away therefrom for 30 seconds as one cycle, and examining whether or not the friction material layer is scorched to the mating member or undergoes damage during 20 cycles of such procedure.

In the column for the severe condition test in Table 2, "back abutment" indicates a state in which the friction material layer of the synchronizer ring is worn out and the structural body 11 abuts against a gear of the mating member.

In Table 2, the compression wear test is a test of pressing the synchronizer ring at a force of 250 Kgf for 4 seconds to a tapered mating member made of a material of SCM 420 in a static state and then keeping it away therefrom for 2 seconds as one cycle. This is repeated for 10,000 cycles, and then the pressing force is increased at steps of 250 Kgf each and the synchronizer ring is pressed to the mating member for 10,000 cycles on every increase of the pressing force. The value of the pressing force that the friction material can finally endure is thereby determined.

From Table 2, it can be seen that sample Nos. 1 to 10 cause less damage to the mating member than sample Nos. 11 to 20. Further, it has found that the values in the severe condition test and the compression wear test are also relatively high for units incorporating the invention.

That is, when the friction material comprises 30 to 70% by weight of carbon particles, 10 to 40% by weight of a thermosetting resin, 5 to 30% by weight of metal fibers or metal particles and 5 to 40% by weight of inorganic fibers or inorganic particles and the porosity of the friction material is 10 to 50%, the friction material has wear resistance, heat resistance and scorching resistance and further has excellent rigidity.

Each of the ingredients contained in the friction material provides the friction material with the following features.

The carbon material is excellent in heat resistance to improve the heat resistance of the friction material. Therefore, the synchronizer ring can endure braking frictional heat upon misoperation for the shift lever and is less scorched to the mating member. If the carbon material is less than 30% by weight, the heat resistance of the friction material is reduced and the friction material layer is scorched to the mating member as shown in the column for the severe condition test for sample No. 11. If the carbon material exceeds 70% by weight, the rigidity of the friction material is reduced and the pressing force that the friction material layer can endure is decreased as shown in the column for the compression wear test for sample No. 12.

The carbon material used in the examples is artificial porous graphite particles. When the size distribution of the graphite particles used in the friction material is such that not less than 50% of the entire number of particles have a particle diameter from 44 to 250 μm, a desirable porosity of the friction material can be obtained and the diameter of pores formed in the friction material can be made into a desirable diameter. Thus, the dynamic friction coefficient of the friction material can be made greater than that of metal friction materials. In particular, if the porosity of the friction material is from 10 to 50%, the formation of oil membranes at the friction boundary between the synchronizer ring and the mating member is retarded to obtain a friction material of a large dynamic friction coefficient.

The thermosetting resin has a function as a binder for each of the ingredients in the friction material, to improve the rigidity of the friction material. The thermosetting resin used is preferably at least one of a novolac type phenol resin, epoxy modified phenol resin, melamine modified phenol resin, cashew modified phenol resin, hydrocarbon resin modified phenol resin and cresol modified phenol resin. Particularly if the thermosetting resin is a novolac type phenol resin, the friction material can be molded easily and the cost for the friction material can be reduced.

If the thermosetting resin is less than 10% by weight, the rigidity of the friction material is reduced and the pressing force that the friction material layer can endure is reduced as shown in the column for the compression wear test for sample No. 12. If the thermosetting resin exceeds 40% by weight, the amount of the thermosetting resin softened by heat is increased, failing to obtain a desired porosity. Accordingly, the dynamic friction coefficient of the friction material cannot be increased (See the column for porosity for sample No. 11).

The metal fibers or metal particles suppress a thermal fading phenomenon to prevent the dynamic coefficient of the friction material from being reduced by braking frictional heat. The thermal fading phenomenon can occur when the synchronizer ring is kept pressed for a long period of time to the mating member, such that oils between the friction material layer and the mating member are lost and the dynamic friction coefficient of the friction material is reduced by the frictional heat. If the thermal fading phenomenon should occur in the friction material layer, it takes a longer time for the operation of the synchronizer ring.

The metal fibers or metal particles comprise an alloy of aluminum, copper, iron, nickel, zinc or lead as the main ingredient. If the metal fibers or metal particles are less than 5% by weight of the friction material, the dynamic friction coefficient is reduced (refer to sample Nos. 12 and 14). Further, if they exceed 40% by weight, the synchronizer ring may stick to the mating member.

The inorganic fibers or inorganic particles reinforce the thermosetting resin as a binder to obtain a desired porosity. The inorganic fibers or inorganic particles comprise barium sulfate, wollastonite, silicon, potassium titanate, glass or alumina.

If the inorganic fibers or inorganic particles are less than 5% by weight, they can no longer reinforce the thermosetting resin as a binder. If they exceed 40% by weight, the softness and flexibility of the friction material are deteriorated and the friction material layer abrades the mating member (refer to the column for damage to mating member for sample No. 14).

Further, if the organic fibers, particularly, heat resistant organic synthesis fibers, are added to the friction material, the dynamic friction coefficient of the friction material can be made greater as compared with that of paper (refer to sample Nos. 8 and 10), the porosity of the friction material is increased to 30% or more and the friction material is provided with softness and flexibility. As actual examples of such organic fibers, phenolic organic fibers such as of alamide pulp, alamide chop, acryl pulp and acryl chop are suitable.

However, if the organic fibers are added by 10% or more, the other ingredients can not be dispersed homogeneously to reduce the flowability of the friction material upon molding the synchronizer ring. Accordingly, it is difficult to mold the synchronizer ring. Further, the heat resistance of the friction material layer is also reduced.

Further, if cashew dust is added, the softness and flexibility of the friction material can be improved to increase the dynamic friction coefficient (refer to sample Nos. 9 and 10). However, if cashew dust is added by 10% or more to the friction material, the dynamic friction coefficient is excessive, so that the friction material layer tends to scorch to the mating member (refer to the column for severe condition test for sample No. 15).

Thus, friction material for a synchronizer ring of the present invention is excellent in heat resistance, wear resistance, scorching resistance and porosity. Accordingly, it can prevent scorching of the friction material layer and reduce the abrasion amount to extend the working life of the synchronizer ring. Further, the synchronizer ring can be operated in a short period of time.

Many modifications and variations to the preferred embodiments described will be apparent to those skilled in the art. Therefore, the invention should not be limited to the particular embodiments described, but should be defined by the claims which follow.

I claim:

1. A synchronizer ring for a gear change transmission, comprising:
   a friction material for frictionally engaging a mating member of said gear change transmission so as to synchronously rotate said ring and member, said friction material comprising:
   30 to 70% by weight of a carbon material;
   10 to 40% by weight of a thermosetting resin;
   5 to 30% by weight of metal fibers or metal particles; and
   5 to 40% by weight of inorganic fibers or inorganic particles;
   wherein said friction material has a porosity of 10 to 50%.

2. A synchronizer ring as defined in claim 1, wherein said carbon material is porous graphite particles and not less than 50% of the entire number of said graphite particles have a particle diameter from 44 to 250 μm.

3. A synchronizer ring as defined in claim 1, wherein said thermosetting resin is a phenol resin.

4. A synchronizer ring as defined in claim 1, wherein said metal fibers or metal particles are made of a metal alloy which contains as a main ingredient a metal selected from the group consisting of aluminum, copper, iron, nickel, zinc and lead.

5. A synchronizer ring as defined in claim 1, wherein said inorganic fibers or inorganic particles are made of a material selected from the group consisting of barium sulfate, wollastonite, silicon, potassium titanate, glass and alumina.

6. A synchronizer ring as defined in claim 1, further comprising organic fibers and cashew dust each of not more than 10% by weight.

7. A synchronizer ring as defined in claim 1, wherein said friction material defines a conical surface.

8. A synchronizer ring as defined in claim 1, further comprising a ring shaped structural body with which said friction material is integrally molded.

9. A synchronizer ring as defined in claim 8, wherein an inner circumferential surface of said synchronizer ring is defined by said friction material.

10. A synchronizer ring as defined in claim 9, wherein said inner circumferential surface of said synchronizer ring tapers in diameter.

11. A synchronizer ring as defined in claim 10, wherein said structural body defines a radially outer surface of said synchronizer ring.

12. A synchronizer ring as defined in claim 11, wherein said structural body is made of brass.

* * * * *